(12) United States Patent
Knaul et al.

(10) Patent No.: US 11,268,388 B2
(45) Date of Patent: Mar. 8, 2022

(54) COMPOSITE REINFORCED ROTOR

(71) Applicant: Raytheon Technologies Corporation, Farmington, CT (US)

(72) Inventors: David A. Knaul, Glastonbury, CT (US); Seung-Woo Choi, Hartford, CT (US); Michael Raymond LaFavor, Manchester, CT (US); Anthony R. Bifulco, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/851,696

(22) Filed: Apr. 17, 2020

(65) Prior Publication Data
US 2021/0324748 A1    Oct. 21, 2021

(51) Int. Cl.
| | | |
|---|---|---|
| *F01D 5/30* | (2006.01) | |
| *F01D 5/34* | (2006.01) | |
| *F01D 25/00* | (2006.01) | |
| *F01D 5/28* | (2006.01) | |
| *F01D 5/06* | (2006.01) | |

(52) U.S. Cl.
CPC ........... *F01D 5/3046* (2013.01); *F01D 5/282* (2013.01); *F01D 5/3069* (2013.01); *F01D 5/34* (2013.01); *F01D 25/005* (2013.01); *F01D 5/06* (2013.01); *F05D 2240/80* (2013.01); *F05D 2300/502* (2013.01); *F05D 2300/603* (2013.01)

(58) Field of Classification Search
CPC .......... F01D 5/34; F01D 5/282; F01D 25/005; F01D 5/06; F01D 5/3015; F01D 5/3046; F01D 5/3069; F05D 2240/80; F05D 2300/603; F05D 2300/502
See application file for complete search history.

(56) References Cited

U.S. PATENT DOCUMENTS

| | | | |
|---|---|---|---|
| 2,938,705 A * | 5/1960 | Moore | ................. F01D 5/3053 415/190 |
| 3,610,772 A | 10/1971 | Wagle et al. | |
| 3,610,777 A * | 10/1971 | Wagle | ...................... F01D 5/06 416/198 R |
| 3,888,602 A | 6/1975 | Nichols et al. | |
| 5,632,600 A * | 5/1997 | Hull | ......................... F01D 5/06 416/198 A |
| 5,660,526 A | 8/1997 | Ress, Jr. | |
| 6,213,720 B1 * | 4/2001 | Farmer | .................... F01D 5/06 416/229 A |

(Continued)

FOREIGN PATENT DOCUMENTS

FR    2893093 B1    2/2008

OTHER PUBLICATIONS

English machine translation of FR 2893093A1, Dec. 19, 2020.*
European Search report Application No. EP21168971; dated Sep. 2, 2021; pp. 8.

*Primary Examiner* — Christopher Verdier
(74) *Attorney, Agent, or Firm* — Cantor Colburn LLP

(57) ABSTRACT

A component of a rotor system is provided and includes a disk and a reinforcing ring. The disk includes an airfoil element, a web extending radially inwardly from the airfoil element and an arm element extending axially from the web. The reinforcing ring is formed of fiber reinforced materials and is disposed to fit about the arm element.

14 Claims, 4 Drawing Sheets

(56) References Cited

U.S. PATENT DOCUMENTS

| | | | |
|---|---|---|---|
| 2003/0233822 A1* | 12/2003 | Albrecht | F01D 21/045 60/39.091 |
| 2007/0189890 A1* | 8/2007 | Snowsill | F01D 5/085 415/115 |
| 2007/0231144 A1* | 10/2007 | Schreiber | F04D 29/023 416/193 A |
| 2016/0138399 A1* | 5/2016 | Bifulco | F01D 5/34 60/805 |

* cited by examiner

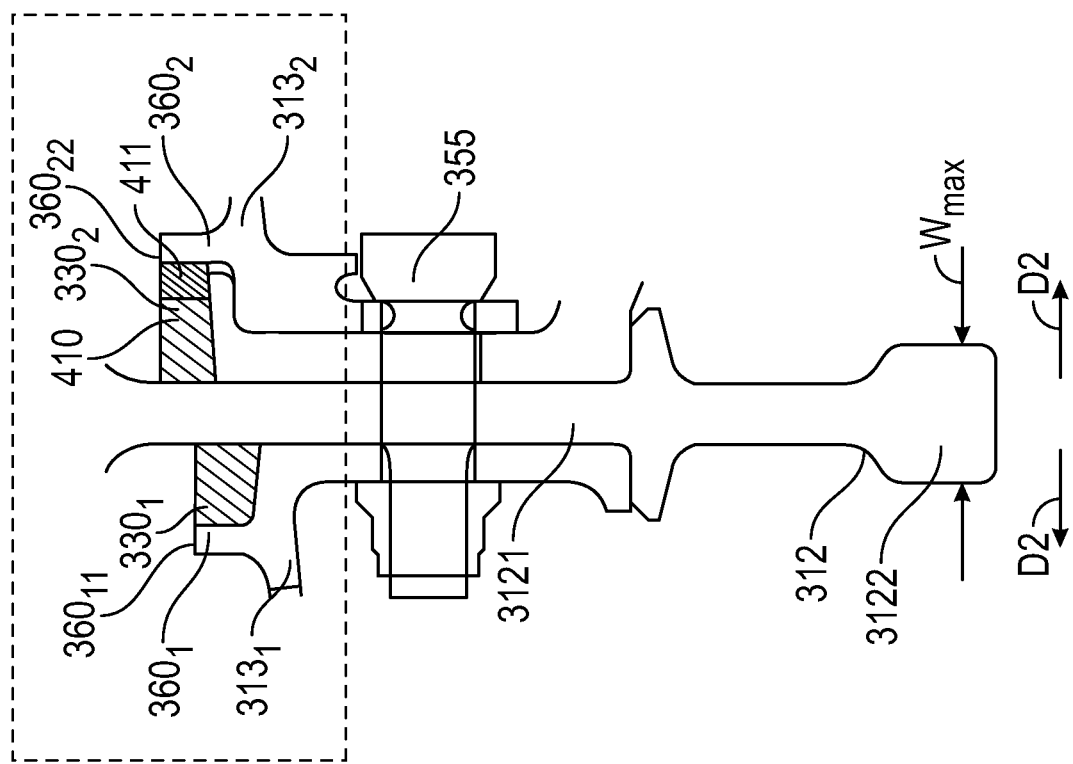
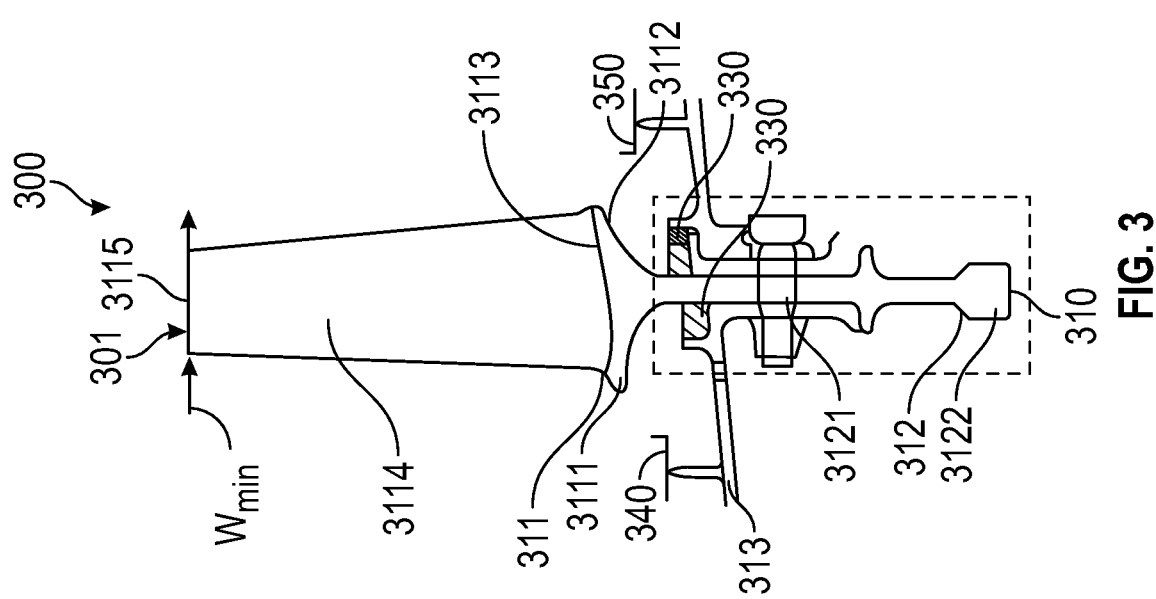

COMPOSITE REINFORCED ROTOR

BACKGROUND

Exemplary embodiments of the present disclosure relate generally to gas turbine engines and, in one embodiment, to a composite reinforced rotor of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

Gas turbine engines and, in particular, the rotating structures of gas turbine engines can be sensitive to weight. For example, the materials that the rotor is formed from are often required to withstand high steady and cyclic stresses. While fiber reinforced composite materials typically offer good structural capabilities, they can be difficult to form into complex shapes consistent with a conventionally bladed disk or integrally bladed disk of a gas turbine engine rotor.

Accordingly, a need exists for an innovative solution that integrates composite reinforcement into a metallic rotor assembly to thus provide a relatively light weight and/or compact rotor system.

BRIEF DESCRIPTION

According to an aspect of the disclosure, a component of a rotor system is provided and includes a disk and a reinforcing ring. The disk includes an airfoil element, a web extending radially inwardly from the airfoil element and an arm element extending axially from the web. The reinforcing ring is formed of fiber reinforced materials and is disposed to fit about the arm element.

In accordance with additional or alternative embodiments, the airfoil element includes a platform having a radially interior surface from which the web extends radially inwardly and a radially exterior surface and an airfoil extending radially outwardly from the radially exterior surface, the web includes a main member extending radially inwardly from the airfoil element and the component of the rotor system further includes a bore, which is disposed at a distal end of the main member.

In accordance with additional or alternative embodiments, the bore radially accommodates a hub or rotor element.

In accordance with additional or alternative embodiments, the reinforcing ring and the arm element have complementary conical shapes.

In accordance with additional or alternative embodiments, the fiber reinforced materials includes carbon fiber reinforced epoxy.

In accordance with additional or alternative embodiments, the disk includes a first arm element extending axially forwardly from the web and a second arm element extending axially aft from the web and the reinforcing ring is provided as first and second reinforcing rings disposed to fit about the first and second arm elements, respectively.

According to an aspect of the disclosure, a component of a rotor system is provided and includes a disk and a reinforcing ring. The disk includes an airfoil element, a web extending radially inwardly from the airfoil element, an arm element extending axially from the web and including a retaining feature and a bore, which has a maximum width that is narrower than a minimum width of the airfoil element. The reinforcing ring is formed of fiber reinforced materials and is disposed to fit about the arm element and to be axially retained by the retaining feature.

In accordance with additional or alternative embodiments, the airfoil element includes a platform having a radially interior surface from which the web extends radially inwardly and a radially exterior surface and an airfoil extending radially outwardly from the radially exterior surface and including a tip defining the minimum width of the airfoil element, the web includes a main member extending radially inwardly from the airfoil element and the bore is disposed at a distal end of the main member.

In accordance with additional or alternative embodiments, the reinforcing ring and the arm element have complementary conical shapes.

In accordance with additional or alternative embodiments, the fiber reinforced materials include carbon fiber reinforced epoxy.

In accordance with additional or alternative embodiments, the disk includes a first arm element extending axially forwardly from the web and a second arm element extending axially aft from the web, the retaining feature includes first and second retaining features protruding from the first and second arm elements, respectively and the reinforcing ring is provided as first and second reinforcing rings disposed to fit about the first and second arm elements, respectively, and to be axially retained between the first retaining feature and the web and between the second retaining feature and the web, respectively.

According to an aspect of the disclosure, a gas turbine engine is provided and includes compressor and turbine sections and components disposed in the compressor and turbine sections.

In accordance with additional or alternative embodiments, at least one of the fiber reinforced materials of the reinforcing rings of each component of the rotor system vary along a centerline of the compressor and turbine sections and capabilities of the fiber reinforced materials of the reinforcing rings of each component of the rotor system to withstand high-temperatures and high-pressures increase with increasing aft positioning along the centerline.

According to an aspect of the disclosure, a component of a rotor system having a rotor or hub element is provided and includes a disk, a bore and a reinforcing ring. The disk includes an airfoil element, a web extending radially inwardly from the airfoil element and an arm element extending axially from the web. The bore is disposed at an end of the web. The reinforcing ring is formed of fiber reinforced materials and is disposed to fit about the arm element. The web has a length that positions the bore to radially accommodate the rotor or hub element with radial space between the bore and the rotor or hub element.

In accordance with additional or alternative embodiments, the airfoil element includes a platform having a radially interior surface from which the web extends radially inwardly and a radially exterior surface and an airfoil extending radially outwardly from the radially exterior surface, the web includes a main member extending radially inwardly from the airfoil element and the bore is disposed at a distal end of the main member.

In accordance with additional or alternative embodiments, the reinforcing ring and the arm element have complementary conical shapes.

In accordance with additional or alternative embodiments, the fiber reinforced materials include carbon fiber reinforced epoxy.

In accordance with additional or alternative embodiments, the disk includes a first arm element extending axially forwardly from the web and a second arm element extending axially aft from the web and the reinforcing ring is provided as first and second reinforcing rings disposed to fit about the first and second arm elements, respectively.

According to an aspect of the disclosure, a gas turbine engine is provided and includes compressor and turbine sections and components disposed in the compressor and turbine sections.

In accordance with additional or alternative embodiments, at least one of the fiber reinforced materials of the reinforcing rings of each component of the rotor system vary along a centerline of the compressor and turbine sections and capabilities of the fiber reinforced materials of the reinforcing rings of each component of the rotor system to withstand high-temperatures and high-pressures increase with increasing aft positioning along the centerline.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 3 is a side view of a component of a rotor system with reinforcing composite rings and retaining features in accordance with embodiments;

FIG. 4 is an enlarged side view of the portion of the component of FIG. 3 that is encompassed by the dashed line of FIG. 3 in accordance with embodiments;

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
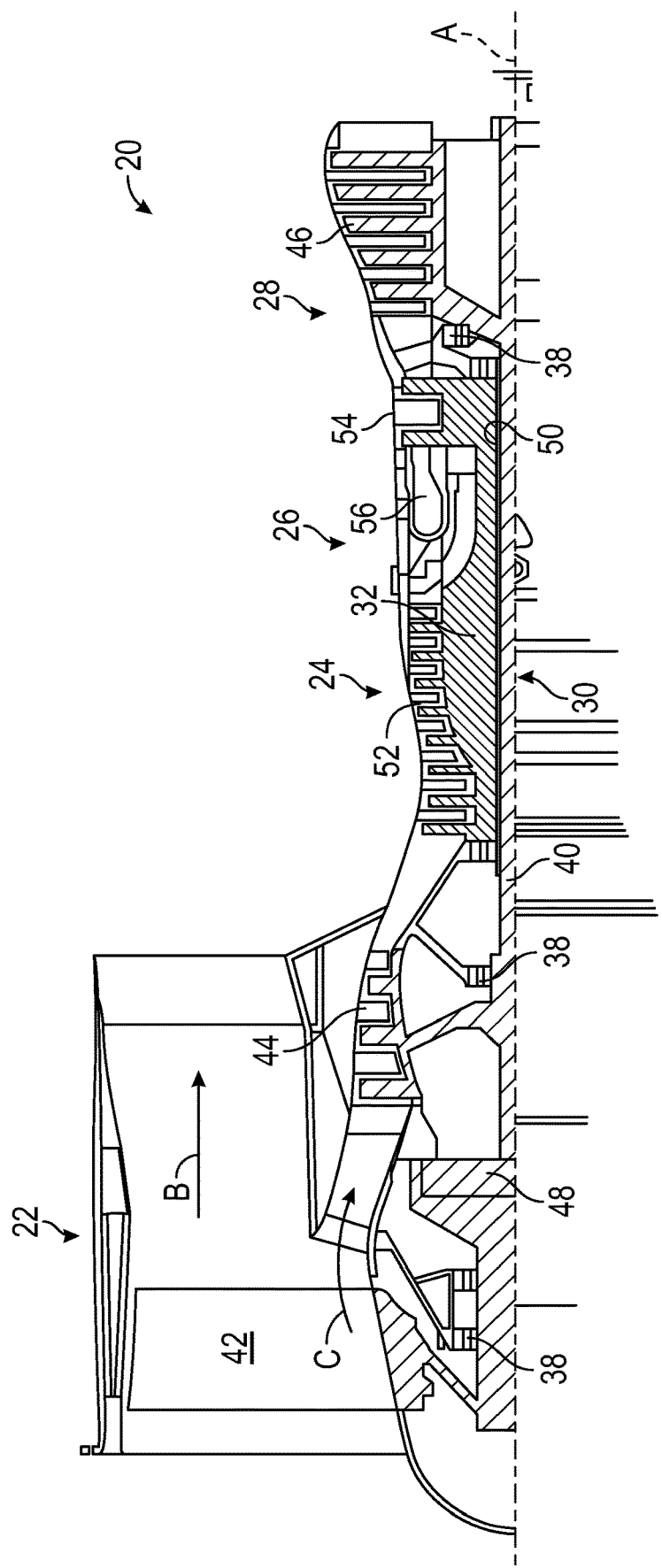
FIG. 1 is a partial cross-sectional view of a gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans and may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

As will be described below, features of a rotor system of a gas turbine engine, such as the gas turbine engine 20 of FIG. 1, are provided to retain composite reinforcing rings. The composite reinforcing rings can be manufactured separately from elements of the rotor system and can be relatively easily installed during assembly. The composite reinforcing rings can also be later removed and reinstalled to facilitate inspection or repair of both the rotor system and the composite components.

Figure 2:
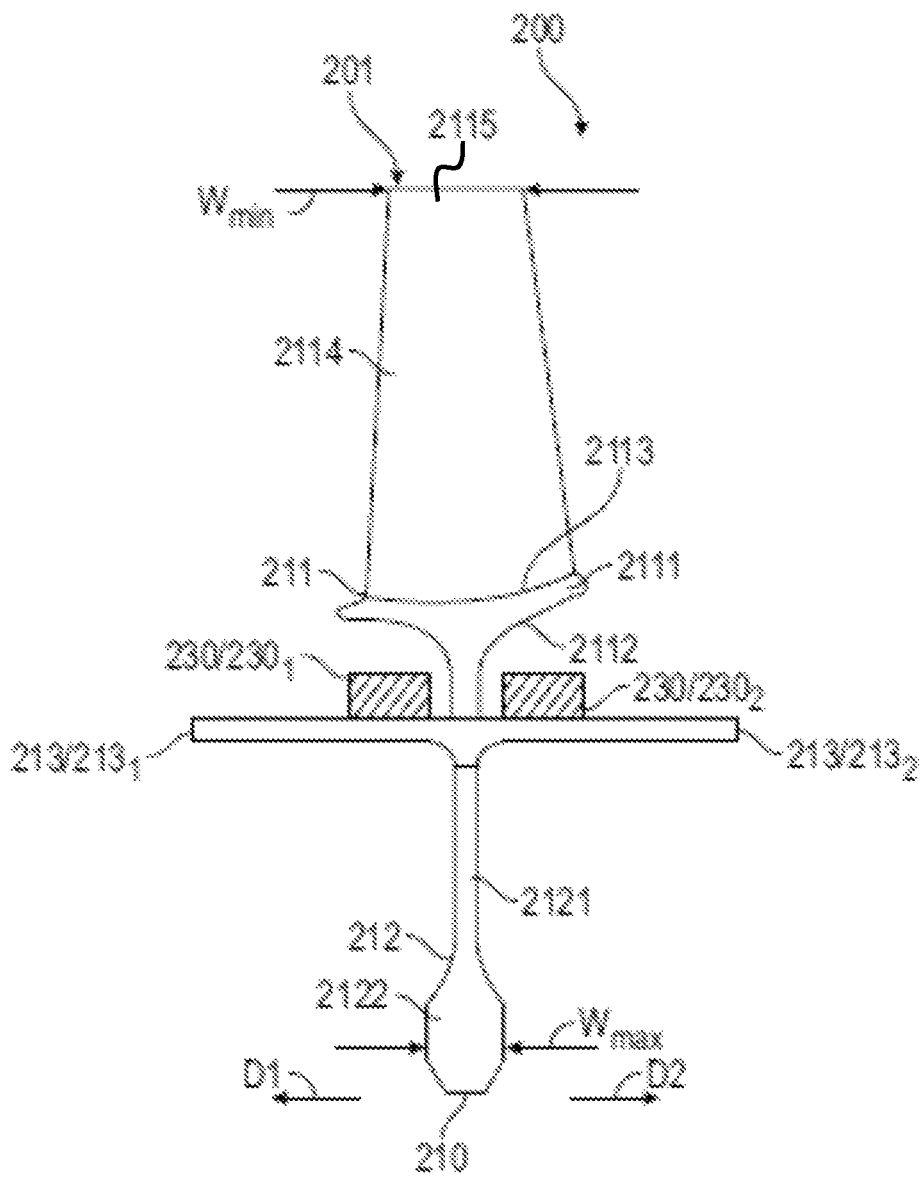
FIG. 2 is a side view of a component of a rotor system with reinforcing composite rings in accordance with embodiments.

With continued reference to FIG. 1 and with additional reference to FIG. 2, a component 201 of a rotor system 200 is provided for use in at least the high and low pressure sections of each of the compressor and turbine sections 24 and 28 of the gas turbine engine 20 of FIG. 1, for example.

The component 201 includes a disk 210 and a reinforcing ring 230. The disk 210 includes an airfoil element 211, a web 212, an arm element 213 and a bore 2122. The airfoil element 211 includes a platform 2111 that has a radially interior surface 2112 and a radially exterior surface 2113 and an airfoil 2114. The airfoil 2114 extends radially outwardly from the radially exterior surface 2113 of the platform 2111 and includes pressure and suction surfaces, leading and trailing edges at which the pressure and suction surfaces meet and a tip 2115. The tip 2115 can, but is not required to, define a minimum width $W_{min}$ of the airfoil element 211 as a whole. The web 212 extends radially inwardly from the radially interior surface 2112 of the platform 2111 of the airfoil element 211 and includes a main member 2121. The main member 2121 extends radially inwardly from the radially interior surface 2112 of the platform 2111 of the airfoil element 211. The bore 2122 is disposed at a distal end of the main member 2121 and flares outwardly from the main member 2121. In accordance with embodiments, the bore 2122 has sides that flare outwardly in multiple directions D1, D2 from the main member 2121. The arm element 213 extends axially from the web 212 and can form an internal gas path wall of the gas turbine engine 20. The reinforcing ring 230 is formed of fiber reinforced materials, such as carbon fiber reinforced epoxy (organic or inorganic), and is disposed to fit tightly or with an interference fit about the arm element 213.

The bore 2122 is distinct from the web 212 and provides radial restraint to the rest of the corresponding structure. The web 212 connects the bore 2122 to the airfoil element 211 and a portion of the web 212 can also provide radial restraint. The reinforcing ring 230 can provide additional and efficient radial restraint even while positioned at a more outboard radial position than the bore 2122 because the composite material has lower density and higher strength than typical metals used for rotor features.

Here, it is to be understood that a self-sustaining radius can be defined as a radius where radial growth of the disk 210 equals a radial growth of a free spinning ring. Mass radially inboard of the self-sustaining radius is load carrying and mass radially outboard of the self-sustaining radius does not have sufficient strength to support itself. For a given rotational speed, the self-sustaining radius is a function of material density and strength.

In accordance with embodiments, even with the flaring of the bore 2122 in the multiple directions D1, D2 from the main member 2121, the bore 2122 can have, but is not required to have, a local maximum width $W_{max}$ that is narrower than the minimum width $W_{min}$ of the airfoil element 211 as a whole. This characteristic narrowness of the bore 2122 is afforded by the presence of the reinforcing ring 230, which allows for a volume reduction and thus a weight reduction of the bore 2122. In accordance with alternative embodiments, the presence of the reinforcement ring 230 can also permit a radial height of the bore 2122 to be extended outboard with or without characteristic narrowness of the bore 2122.

To an extent that components of a conventional rotor system each have an airfoil element and a web with a bore, each bore in these cases can have a relatively large width as compared to a width of the corresponding airfoil element. This configuration tends to substantially increase a weight of the conventional rotor system and this is especially true where the bore is metallic or a metallic alloy. By contrast, the component 201 of the rotor system 200 of FIG. 2 has a reduced weight owing to the characteristic narrowness of the bore 2122 and/or the radial height of the bore 2122 being extended outboard. In each case, the reduced weight modification is afforded by the presence of the reinforcing ring 230.

To the extent that the reinforcing ring 230 is disposed to fit about the arm element 213 with the interference fit, the interference fit results from an inner diameter of the reinforcing ring 230 being slightly smaller than the outer diameter of the arm element 213 and allows the design of the component 201 to take advantage of superior strength properties of the composite materials of the reinforcing ring 230. In particular, since the composite materials of the reinforcing ring 230 can offer load sharing or can take more loading than a tightly fit ring, further bore size reductions and radial location flexibilities can be achieved.

In accordance with further embodiments and as shown in FIG. 2, the disk 210 includes first arm element $213_1$ and second arm element $213_2$ and the reinforcing ring 230 is provided as first reinforcing ring $230_1$ and second reinforcing ring $230_2$. The first arm element $213_1$ extends axially forwardly from the web 212 and the second arm element $213_2$ extends axially aft from the web 212. The first reinforcing ring $230_1$ is disposed to fit tightly or with an interference fit about the first arm element $213_1$. The second reinforcing ring $230_2$ is disposed to fit tightly or with an interference fit about the second arm element $213_2$.

To the extent that the first and second reinforcing rings $230_1$ and $230_2$ are disposed to fit about the first and second arm elements $213_1$ and $213_2$ with the interference fits, the interference fits result from inner diameters of the first and second reinforcing rings $230_1$ and $230_2$ being slightly smaller than outer diameters of the first and second arm elements $213_1$ and $213_2$ and allow the design of each component 201 to take advantage of superior strength properties of the composite materials of the first and second reinforcing rings $230_1$ and $230_2$. In particular, since the composite materials of the first and second reinforcing rings $230_1$ and $230_2$ can offer load sharing or can take more loading than tightly fit rings, further bore size reductions and radial location flexibilities can be achieved.

With reference back to FIG. 1 and with additional reference to FIGS. 3 and 4, gas turbine engine 20 is provided and includes compressor section 24 and turbine section 28 as well as components 301 of rotor systems 300, which are respectively disposed in the compressor section 24 and the turbine section 28.

Each component 301 of each rotor system includes a disk 310 and a reinforcing ring 330. The disk 310 includes an airfoil element 311, a web 312, an arm element 313 and a bore 3122. The airfoil element 311 includes a platform 3111 that has a radially interior surface 3112 and a radially exterior surface 3113 and an airfoil 3114. The airfoil 3114 extends radially outwardly from the radially exterior surface 3113 of the platform 3111 and includes pressure and suction surfaces, leading and trailing edges at which the pressure and suction surfaces meet and a tip 3115. The tip 3115 can, but is not required to, define a minimum width $W_{min}$ of the airfoil element 311 as a whole. The web 312 extends radially inwardly from the radially interior surface 3112 of the platform 3111 of the airfoil element 311 and includes a main member 3121. The main member 3121 extends radially inwardly from the radially interior surface 3112 of the platform 3111 of the airfoil element 311. The bore 3122 is disposed at a distal end of the main member 3121 and flares outwardly from the main member 3121. In accordance with embodiments, the bore 3122 has sides that flare outwardly in multiple directions D1, D2 from the main member 3121. The arm element 313 extends axially from the web 312 and can form an internal gas path wall of the gas turbine engine 20. The reinforcing ring 330 is formed of fiber reinforced materials, such as carbon fiber reinforced epoxy (organic or inorganic), and is disposed to fit tightly or with an interference fit about the arm element 313.

In accordance with embodiments, even with the flaring of the bore 3122 in the multiple directions from the main member 3121, the bore 3122 can have, but is not required to have, a local maximum width $W_{max}$ that is narrower than the minimum width $W_{min}$ of the airfoil element 311 as a whole. This characteristic narrowness of the bore 3122 is afforded by the presence of the reinforcing ring 330, which allows for a volume reduction and thus a weight reduction of the bore 3122. In accordance with alternative embodiments, the presence of the reinforcement ring 330 can also permit a radial height of the bore 3122 to be extended outboard.

As above, the component 301 of the rotor system 300 of FIGS. 3 and 4 has a reduced weight owing to the characteristic narrowness of the bore 3122 or to the radial height of the bore 3122 being extended outboard. In each case, the reduced weight modification is afforded by the presence of the reinforcing ring 330.

To the extent that the reinforcing ring 330 is disposed to fit about the arm element 313 with the interference fit, the interference fit results from an inner diameter of the reinforcing ring 330 being slightly smaller than the outer diameter of the arm element 313 and allows the design of the component 301 to take advantage of superior strength properties of the composite materials of the reinforcing ring 330. In particular, since the composite materials of the reinforcing ring 330 can offer load sharing or can take more loading than a tightly fit ring, further bore size reductions and radial location flexibilities can be achieved.

In accordance with further embodiments, the disk 310 can be axially interposed between a forward blade/vane element 340 and an aft blade/vane element 350.

In any case, the disk 310 includes first arm element $313_1$ and second arm element $313_2$ and the reinforcing ring 330 is provided as first reinforcing ring $330_1$ and second reinforcing ring $330_2$. The first arm element $313_1$ extends axially forwardly from the web 312 and the second arm element $313_2$ extends axially aft from the web 312. The first and second arm elements $313_1$ and $313_2$ can be secured to the web 312 by fastening element 355. The first reinforcing ring $330_1$ is disposed to fit tightly or with an interference fit about the first arm element $313_1$. The second reinforcing ring $330_2$ is disposed to fit tightly or with an interference fit about the second arm element $330_2$. In accordance with embodiments, the first and second reinforcing rings $330_1$ and $330_2$ can have conical shapes (see FIG. 4) characterized with decreasing radial thickness with respectively increasing forward and aft axial distances from the web 312 and the first and second arm elements $313_1$ and $313_2$ have conical shapes complementing the conical shapes of the first and second reinforcing rings $330_1$ and $330_4$ respectively. In addition, the disk 310 further includes first ring retaining feature $360_1$, which is disposed and configured to axially retain the first reinforcing ring $330_1$ against the web 312 and includes an upper edge $360_{11}$, and a second ring retaining feature $360_2$, which is disposed and configured to axially retain the second reinforcing ring $330_2$ against the web 312 and includes an upper edge $360_{22}$. In accordance with embodiments, the conical shapes of the first and second reinforcing rings can be characterized in that they have uppermost surfaces which are level with the upper edges $360_{11}$ and $360_{22}$ of the first and second ring retaining features $360_1$ and $360_4$ respectively.

To the extent that the first and second reinforcing rings $330_1$ and $330_2$ are disposed to fit about the first and second arm elements $313_1$ and $313_2$ with the interference fits, the interference fits result from inner diameters of the first and second reinforcing rings $330_1$ and $330_2$ being slightly smaller than outer diameters of the first and second arm elements $313_1$ and $313_2$ and allow the design of each component 301 to take advantage of superior strength properties of the composite materials of the first and second reinforcing rings $330_1$ and $330_2$. In particular, since the composite materials of the first and second reinforcing rings $330_1$ and $330_2$ can offer load sharing or can take more loading than tightly fit rings, further bore size reductions and radial location flexibilities can be achieved.

Although FIG. 4 illustrates that the first ring retaining feature $360_1$ is disposed and configured to axially retain the first reinforcing ring $330_1$ against the web 312 and that the second ring retaining feature $360_2$ is disposed and configured to axially retain the second reinforcing ring $330_2$ against the web 312, it is to be understood that other embodiments exist. For example, additional ring retaining features can be provided between the web 312 and the first and second retaining rings $330_1$ and $330_2$. These additional ring retaining features can be disposed to abut the web 312 or can be disposed at a distance from the web 312.

As shown in FIG. 4, at least one of the first and second reinforcing rings $330_1$ and $330_2$ can be formed of one or more ring sections 410, 411. In these or other cases the one or more ring sections 410, 411 can be formed of different materials and can be arranged axially or in other formations (e.g., radially).

While the first and second reinforcing rings $330_1$ and $330_2$ can be formed of fiber reinforced materials, such as carbon fiber reinforced epoxy (organic or inorganic), the fiber reinforced materials can vary along a centerline (i.e., engine longitudinal axis A) of the high and low pressure sections of each of the compressor and turbine sections 24 and 28 of the gas turbine engine 20 of FIG. 1. In particular, the variance of the fiber reinforced materials of the first and second reinforcing rings $330_1$ and $330_2$ can be provided such that a capability of the fiber reinforced materials to withstand high-temperatures and high-pressures increases with increasing aft positioning along the centerline.

The first and second reinforcing rings $230_1$ and $230_2$ of FIG. 2 and the first and second reinforcing rings $330_1$ and $330_2$ of FIGS. 3 and 4 can be installed prior to, during or after an assembly, repair or service of the gas turbine engine 20 of FIG. 1. In any case, the first and second reinforcing rings $230_1$ and $230_2$ of FIG. 2 and the first and second reinforcing rings $330_1$ and $330_2$ of FIGS. 3 and 4 can be mechanically or thermally expandable and contractible. Where the first and second reinforcing rings $230_1$ and $230_2$ of FIG. 2 and the first and second reinforcing rings $330_1$ and $330_2$ of FIGS. 3 and 4 are mechanically expandable and contractible, installation can involve mechanical ring expansion, a sliding of mechanically expanded rings into position and a release of the mechanical expansion to permit mechanical ring contraction onto the arm elements. Where the first and second reinforcing rings $230_1$ and $230_2$ of FIG. 2 and the first and second reinforcing rings $330_1$ and $330_2$ of FIGS. 3 and 4 are thermally expandable and contractible, installation can involve heating to cause thermal ring expansion, a sliding of thermally expanded rings into position and cooling to permit thermal ring contraction onto the arm elements.

It is to be understood that, while the disks 210 and 310 are described herein as having airfoil elements 211 and 311 that are configured as integral blades, the disks 210 and 310 can also be provided as bladed rotors where the airfoils 2114 and 3114 are physically separate components that are assembled to the disks 210 and 310.

Figure 5:
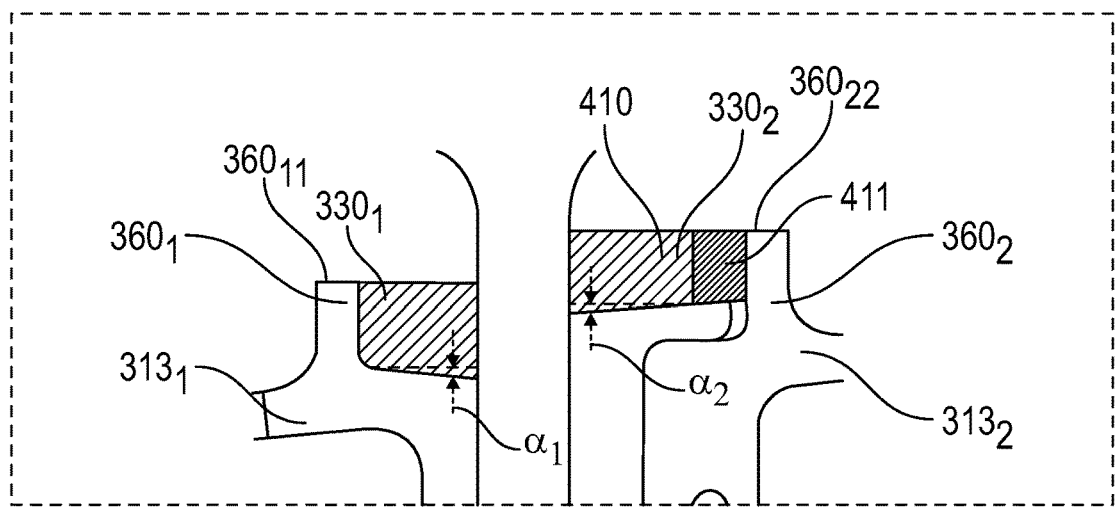
FIG. 5 is an enlarged side view of the portion of the component of FIG. 4 that is encompassed by the dashed line of FIG. 4 in accordance with embodiment.

With reference to FIG. 5, additional details of the component 301 of FIGS. 3 and 4 are shown. In particular, FIG. 5 illustrates that the first and second arm elements $313_1$ and $313_2$ are angled relative to a horizontal plane (i.e., a horizontal plane that is parallel with the engine longitudinal axis A) by angles $a_1$ and $a_2$. Angles $\alpha 1$ and $\alpha 2$ provide the first and second arm elements $313_1$ and $313_2$ and the first and second reinforcing rings $330_1$ and $330_2$ with complementary conical shapes that can improve an ability of each of the first and second reinforcing rings $330_1$ and $330_2$ to fit or to be fit about the first and second arm elements $313_1$ and $313_2$. The complementary conical shapes assure that the first and second reinforcing rings $330_1$ and $330_2$ are disposed in radial contact with the first and second arm elements $313_1$ and $313_2$, respectively. That is, while two pure diameter surfaces that interfere can often only be assembled together by heating and cooling, complementary conical shapes can achieve required contact without such heating and cooling. Moreover, the resulting contact between the spacer cones formed by the angling of the first and second arm elements $313_1$ and $313_2$ and the fiber ring cones formed by the complementary angling of the first and second reinforcing rings $330_1$ and $330_2$ effectively transfers restraint. Here, since the first and second reinforcing rings $330_1$ and $330_2$ are relatively stiff as compared to the first and second arm elements $313_1$ and $313_2$ and the first and second retaining features $360_1$ and $360_2$, the first and second reinforcing rings $330_1$ and $330_2$ tend not to deflect. As such, deflections of the first and second arm elements $313_1$ and $313_2$ and the first and second retaining features $360_1$ and $360_2$ can be prevented.

Although FIG. 5 has been described with reference to the embodiments of FIG. 4, it is to be understood that the arm element(s) and the reinforcing ring(s) of the other embodiments described herein can also be provided with complementary conical shapes.

Figure 6:
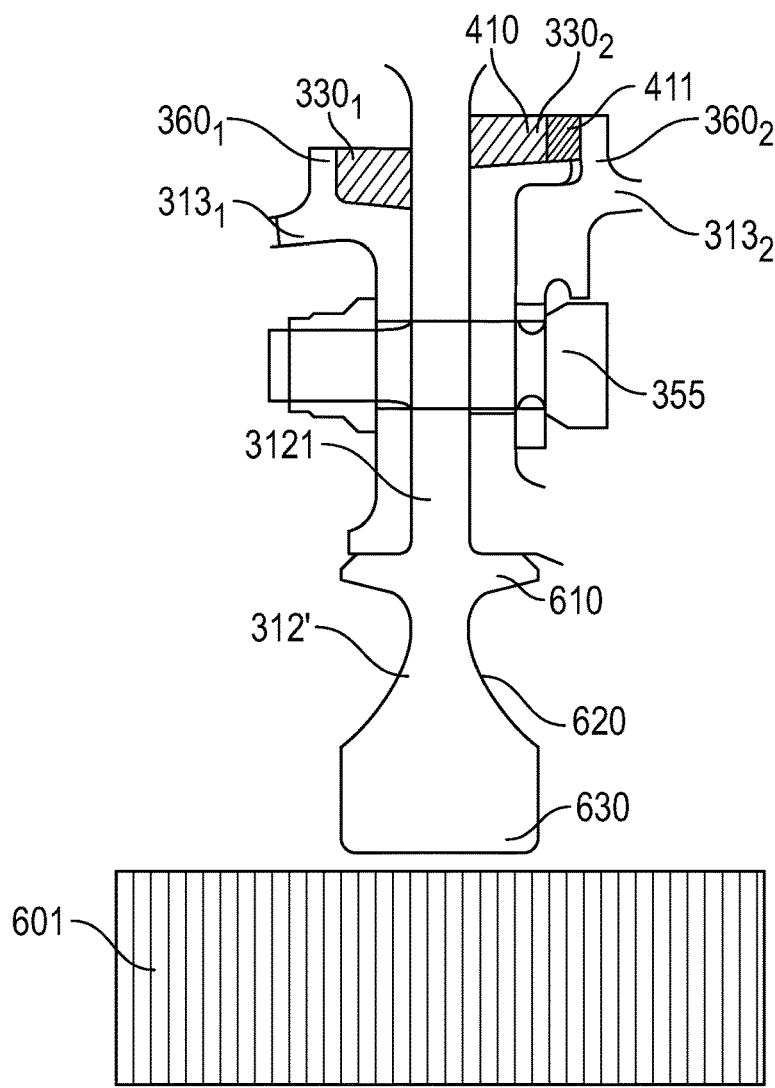
FIG. 6 is an enlarged side view of the portion of the component of FIG. 3 that is encompassed by the dashed line of FIG. 3 with a rotor component and a bore having an increased inner diameter to accommodate the rotor component in accordance with embodiments.

With reference back to FIGS. 3 and 4 and with additional reference to FIG. 6, the component 301 can be provided according to additional embodiments as shown in FIG. 6. The following description will relate to these additional embodiments but will not include repeated descriptions of features of the component 301 that were previously described in detail.

The additional embodiments can be characterized in that the web 312' includes outboard portion 610 and flared portion 620 and is substantially shortened so that a radial position of bore 630 can be increased and moved outboard to provide space that radially accommodates the rotor or hub element 601. The rotor or hub element 601 can be a component of the rotor itself, a bearing support or another piece of rotating or static hardware that is coupled or otherwise proximate to the rotor. In this case, the flared portion 620 begins to flare outwardly immediately adjacent to the outboard portion 610 and the corresponding outboard movement of the bore 630 forms a space with sufficient tolerance between the bore 630 and the rotor or hub element 601. The corresponding outboard movement of the bore 630 effectively reduces a weight of the bore 630 and is afforded by the presence of the first and second reinforcing rings $330_1$ and $330_2$.

Although FIG. 6 has been described with reference to the embodiments of FIGS. 3 and 4, it is to be understood that the other embodiments described herein can also accommodate rotor or hub elements.

Benefits of the features described herein are that, by adding the composite reinforcing rings, a bore of the metal disk of the gas turbine engine rotor system can be reduced in size to thereby save weight and/or a metal bore can be moved radially outwardly in order to provide more space in the bore cavity for other components. That is, the bore in metal disks of gas turbine engine rotor systems is generally positioned as close to the rotor centerline as possible to minimize stress and weight. Normally, the allowable bore position is governed by a "self-sustaining radius," which is the radius at which the bore material is just able to support its own centrifugal load. In accordance with the description provided herein, however, the low density and high strength of the fiber reinforced composite materials used in the composite reinforcing rings results in a much larger self-sustaining radius. This allows for increased flexibility in component positioning to balance minimized weight and geometric constraints.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component of a rotor system, comprising:
a disk comprising an airfoil element, a web extending radially inwardly from the airfoil element, a first arm element extending axially forwardly from the web with a first ring retaining feature and a second arm element extending axially aft from the web with a second ring retaining feature; and
first and second reinforcing rings formed of fiber reinforced materials and disposed to fit about the first and second arm elements, respectively,
wherein the first and second reinforcing rings have conical shapes characterized with uppermost surfaces which are level with the upper edges of the first and second ring retaining features, respectively, and decreasing radial thickness with respectively increasing forward and aft axial distances from the web and the first and second arm elements have conical shapes complementing the conical shapes of the first and second reinforcing rings, respectively.

2. The component of the rotor system according to claim 1, wherein:
the airfoil element comprises a platform having a radially interior surface from which the web extends radially inwardly and a radially exterior surface and an airfoil extending radially outwardly from the radially exterior surface,
the web comprises a main member extending radially inwardly from the airfoil element, and
the component of the rotor system further comprises a bore, which is disposed at a distal end of the main member.

3. The component of the rotor system according to claim 2, wherein the bore radially accommodates a hub or rotor element.

4. The component of the rotor system according to claim 1, wherein the fiber reinforced materials comprise carbon fiber reinforced epoxy.

5. A component of a rotor system, comprising:
a disk comprising:
an airfoil element;
a web extending radially inwardly from the airfoil element;
a first arm element extending axially forwardly from the web and comprising a first ring retaining feature;
a second arm element extending axially aft from the web and comprising a second ring retaining feature; and
a bore, which has a maximum width that is narrower than a minimum width of the airfoil element; and
first and second reinforcing rings formed of fiber reinforced materials, the first and second reinforcing rings being disposed to fit about the first and second arm elements, respectively, and to be axially retained by the first and second ring retaining features, respectively,
wherein the first and second reinforcing rings have conical shapes characterized with uppermost surfaces which are level with the upper edges of the first and second ring retaining features, respectively, and decreasing radial thickness with respectively increasing forward and aft axial distances from the web and the first and second arm elements have conical shapes complementing the conical shapes of the first and second reinforcing rings, respectively.

6. The component of the rotor system according to claim 5, wherein:
the airfoil element comprises a platform having a radially interior surface from which the web extends radially inwardly and a radially exterior surface and an airfoil extending radially outwardly from the radially exterior surface and comprising a tip defining the minimum width of the airfoil element,
the web comprises a main member extending radially inwardly from the airfoil element, and
the bore is disposed at a distal end of the main member.

7. The component of the rotor system according to claim 5, wherein the fiber reinforced materials comprise carbon fiber reinforced epoxy.

8. A gas turbine engine, comprising compressor and turbine sections and components according to the component of claim 5 disposed in the compressor and turbine sections.

9. The gas turbine engine according to claim 8, wherein the fiber reinforced materials of the reinforcing rings of each component of the rotor system vary with increasing aft positioning along a centerline such that capabilities of the fiber reinforced materials of the reinforcing rings of each component of the rotor system to withstand high-temperatures and high-pressures increase with increasing aft positioning along the centerline.

10. A component of a rotor system having a rotor or hub element, the component of the rotor system comprising:
a disk comprising an airfoil element, a web extending radially inwardly from the airfoil element and first and second arm elements extending axially forwardly and aft from the web, respectively, with first and second ring retaining features;
a bore disposed at an end of the web; and
first and second reinforcing rings formed of fiber reinforced materials and disposed to fit about the first and second arm elements, respectively,
wherein the web has a length that positions the bore to radially accommodate the rotor or hub element with radial space between the bore and the rotor or hub element,
wherein the first and second reinforcing rings have conical shapes characterized with uppermost surfaces which are level with the upper edges of the first and second ring retaining features, respectively, and decreasing radial thickness with respectively increasing forward and aft axial distances from the web and the first and second arm elements have conical shapes complementing the conical shapes of the first and second reinforcing rings, respectively.

11. The component of the rotor system according to claim 10, wherein:
the airfoil element comprises a platform having a radially interior surface from which the web extends radially inwardly and a radially exterior surface and an airfoil extending radially outwardly from the radially exterior surface,
the web comprises a main member extending radially inwardly from the airfoil element, and
the bore is disposed at a distal end of the main member.

12. The component of the rotor system according to claim 10, wherein the fiber reinforced materials comprise carbon fiber reinforced epoxy.

13. A gas turbine engine, comprising compressor and turbine sections and components according to the component of claim 10 disposed in the compressor and turbine sections.

14. The gas turbine engine according to claim 13, wherein the fiber reinforced materials of the reinforcing rings of each component of the rotor system vary with increasing aft positioning along a centerline such that capabilities of the fiber reinforced materials of the reinforcing rings of each component of the rotor system to withstand high-temperatures and high-pressures increase with increasing aft positioning along the centerline.

* * * * *